(12) United States Patent
Fridman et al.

(10) Patent No.: US 10,035,119 B2
(45) Date of Patent: Jul. 31, 2018

(54) METHOD OF SHUTTING DOWN A REACTOR

(71) Applicant: Clariant Corporation, Louisville, KY (US)

(72) Inventors: Vladimir Fridman, Louisville, KY (US); Sunil S. Panditrao, Hackettstown, NJ (US)

(73) Assignee: Clariant Corporation, Louisville, KY (US)

( * ) Notice: Subject to any disclaimer, the term of this patent is extended or adjusted under 35 U.S.C. 154(b) by 901 days.

(21) Appl. No.: 14/205,554

(22) Filed: Mar. 12, 2014

(65) Prior Publication Data

US 2014/0273794 A1 Sep. 18, 2014

Related U.S. Application Data

(60) Provisional application No. 61/781,531, filed on Mar. 14, 2013.

(51) Int. Cl.
*B01J 8/02* (2006.01)
*B01J 8/00* (2006.01)
(Continued)

(52) U.S. Cl.
CPC ............ *B01J 8/008* (2013.01); *B01J 8/0285* (2013.01); *B01J 8/0496* (2013.01); *B01J 23/26* (2013.01);
(Continued)

(58) Field of Classification Search
CPC ........ B01J 8/0496; B01J 8/0285; B01J 38/04; B01J 2208/00637; B01J 8/008
(Continued)

(56) References Cited

U.S. PATENT DOCUMENTS 2,311,979 A * 2/1943 Corson ................... C07C 5/322
  208/136
2,419,997 A * 5/1947 Houdry ................... C07C 5/322
  502/320

(Continued)

OTHER PUBLICATIONS

Hakuli, A.; Kytokivi, A.; Krause, A.O.I.; Suntola, T. "Initial Activity of Reduced Chromia/Alumina Catalyst in n-Butane Dehydrogenation Monitored by On-Line FTt-IR Gas Analysis", Journal of Catalysts, 161 (1996), pp. 393-400.*

(Continued)

*Primary Examiner* — Philip Y Louie
*Assistant Examiner* — Aaron W Pierpont

(57) ABSTRACT

A procedure for shutting down a dehydrogenation reactor having a catalyst bed with a chromium-containing catalyst operating at a first elevated temperature comprises cooling the catalyst bed with a first cooling gas to a second elevated temperature lower than the first elevated temperature, removing the first cooling gas, introducing a reducing gas to the catalyst bed, cooling the catalyst bed with a second cooling gas from the second elevated temperature to a third elevated temperature, removing the reducing gas, cooling the catalyst bed to a fourth elevated temperature, and introducing air to cool the catalyst to ambient temperature, whereby the dehydrogenation reactor is shut down. The second cooling gas may be the same as, or different from, the reducing gas. Moreover, the reducing gas may be purged from the reactor by a third cooling gas.

30 Claims, 1 Drawing Sheet

(51) Int. Cl.
*B01J 8/04* (2006.01)
*B01J 23/26* (2006.01)
*B01J 38/04* (2006.01)

(52) U.S. Cl.
CPC ...... *B01J 38/04* (2013.01); *B01J 2208/00371* (2013.01); *B01J 2208/00637* (2013.01)

(58) Field of Classification Search
USPC ........ 454/237; 502/20, 34, 305, 56; 585/654
See application file for complete search history.

(56) References Cited

U.S. PATENT DOCUMENTS

| | | | | |
|---|---|---|---|---|
| 3,842,139 | A | * | 10/1974 | Kehl ........................ B01J 23/42 585/656 |
| 4,071,439 | A | | 1/1978 | Yanik |
| 5,315,056 | A | * | 5/1994 | Feldman .................. B01J 23/90 502/34 |
| 7,112,311 | B2 | | 9/2006 | Yoshizumi |
| 7,582,272 | B2 | | 9/2009 | Glova |
| 2005/0080306 | A1 | * | 4/2005 | Kowaleski ............ B01J 23/745 585/444 |
| 2008/0188695 | A1 | * | 8/2008 | Dieterle .................. B01J 23/96 568/956 |

OTHER PUBLICATIONS

Won, Wangyun, "Online Optimization of CATOFIN Process" International Conference on Control, Automation and Systems 2007, Oct. 17-20, 2007 in COEX, Seoul, Korea.

* cited by examiner

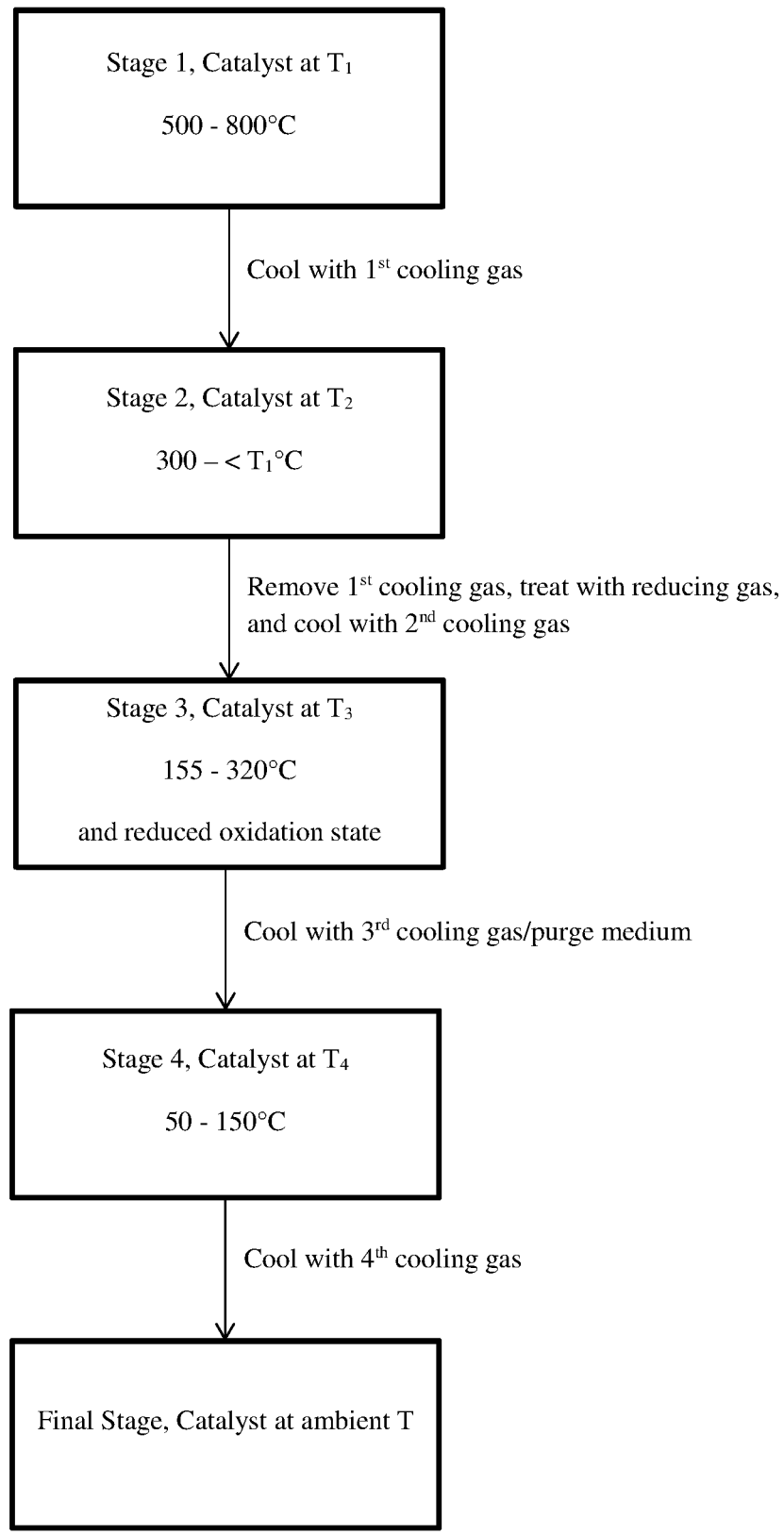

METHOD OF SHUTTING DOWN A REACTOR

CROSS-REFERENCE TO RELATED APPLICATIONS

This application claims priority to U.S. Provisional Patent Application Ser. No. 61/781,531 filed Mar. 14, 2013, which is incorporated herein by reference in its entirety.

FIELD OF THE INVENTION

This application relates to a method of shutting down a dehydrogenation reactor having a catalyst bed containing a chromium-containing catalyst. More particularly, this application relates to a method of shutting down a dehydrogenation reactor having a catalyst bed containing a chromium-containing catalyst, wherein after the shut-down, at least some, and preferably a majority, of the chromium is in a reduced oxidation state.

BACKGROUND

Unsaturated hydrocarbons, e.g. olefins, may be derived by catalytic dehydrogenation of an alkane to create a product more useful and more valuable than the reactant. Olefins are feedstocks for many processes that yield increasingly valuable products through polymerization. Catalytic dehydrogenation of alkanes is a selective way to produce alkenes and was commercialized in the 1930's.

One such catalytic dehydrogenation process is the CATOFIN® process which produces alkenes, e.g. isobutylene, propylene and amylenes, from alkanes, e.g. isobutane, propane and isopentanes respectively. The CATOFIN® process is the most widespread catalytic dehydrogenation process employed in the production of propene, the precursor material to polypropylene. Another dehydrogenation process is the CATADIENE® process which results in the catalytic dehydrogenation of $C_4$ and $C_5$ hydrocarbons to produce diolefins, i.e. dienes, of the same carbon number. The CATOFIN® and CATADIENE® processes utilize a supported chromium catalyst in a series of adiabatic fixed bed reactors in cyclic operation with quickly alternating dehydrogenation and regeneration periods. Other catalytic dehydrogenation processes utilizing supported chromium catalysts are known in the art. Such processes typically employ frequent high temperature regeneration cycles.

Catalysts that are used for the dehydrogenation of light hydrocarbons typically comprise chromium oxide supported on the surface of an aluminum oxide carrier, i.e. chromium-alumina catalysts. Processes utilizing supported chromium catalysts such as chromia-alumina catalysts ($Cr_2O_3/Al_2O_3$) are well known and have been described in technical literature as well as in numerous patents.

Dehydrogenation catalysts become spent after prolonged use through several alternating dehydrogenation and regeneration cycles. Spent catalyst must be removed from the reactor and replaced with fresh catalyst. It is preferred that at least some and preferably a majority of the chromium in the spent catalyst be at a reduced oxidation state when the spent catalyst is removed from the reactor. The applicant has now surprisingly found a method for shutting down a dehydrogenation reactor which method results in at least some and preferably a majority of the chromium in the spent catalyst being at a reduced oxidation state.

SUMMARY OF THE INVENTION

A method for shutting down a dehydrogenation reactor having a catalyst bed with a chromium-containing catalyst operating at a first elevated temperature $T_1$ comprises cooling the catalyst bed with a first cooling gas to a second elevated temperature $T_2$ lower than $T_1$, removing the first cooling gas from the catalyst bed, treating the catalyst bed with a reducing gas to bring the chromium in the catalyst to a reduced oxidation state, cooling the catalyst bed with a second cooling gas from the second elevated temperature $T_2$ to a third elevated temperature $T_3$ lower than $T_2$, removing the reducing gas from the catalyst bed, cooling the catalyst bed with a third cooling gas from the third elevated temperature $T_3$ to a fourth elevated temperature $T_4$ lower than $T_3$, and cooling the catalyst bed to ambient temperature $T_{amb}$, whereby the dehydrogenation reactor is shut down and the spent catalyst can be removed. Advantageously, upon completion of the method of the present application, at least some, and preferably a majority, of the chromium in the chromium-containing catalyst will be at a reduced oxidation state.

The reducing gas is preferably introduced after the catalyst is brought from the first elevated temperature $T_1$ to the second elevated temperature $T_2$, to bring the catalyst to the desired reduced oxidation state. In one embodiment, the reducing gas and the second cooling gas are the same gas. In another embodiment, the reducing gas and the second cooling gas are different gases.

The reducing gas is preferably purged from the catalyst bed after the catalyst has reached the desired oxidation state. If the second cooling gas is different from the reducing gas, then the second cooling gas can serve as the reducing gas purge medium. Otherwise, the third cooling gas can serve as the reducing gas purge medium.

DESCRIPTION OF THE FIGURE

FIG. 1 is a flow chart illustrating the stages of the inventive method of shutting down a reactor.

DETAILED DESCRIPTION

The present application generally relates to a method of shutting down a dehydrogenation reactor used for manufacturing light olefins and di-olefins from light alkanes, the reactor having a catalyst bed containing a chromium-containing catalyst, such that at the conclusion of the shut-down method of the present application, at least some, and preferably a majority, of the chromium in the catalyst bed is in a reduced oxidation state.

One exemplary embodiment of such a method of shutting down a dehydrogenation reactor housing a catalyst bed containing a chromium-containing catalyst, with the catalyst bed operating at a first elevated temperature under standard dehydrogenation conditions, comprises:

(a) cooling the catalyst bed with a first cooling gas from the first elevated temperature to a second elevated temperature lower than the first elevated temperature;

(b) removing the first cooling gas from the catalyst bed while maintaining the catalyst bed at about said second elevated temperature;

(c) treating the catalyst bed with a reducing gas for a period of time sufficient to cause chemical reduction of at least some of the chromium in the catalyst to a reduced oxidation state;

(d) cooling the catalyst bed with a second cooling gas from the second elevated temperature to a third elevated temperature lower than the second elevated temperature;

(e) removing the reducing gas from the catalyst bed;

(f) cooling the catalyst bed with a third cooling gas from the third elevated temperature to a fourth elevated temperature lower than the third elevated temperature; and (g) cooling the catalyst bed with a fourth cooling gas from the fourth elevated temperature to ambient temperature, whereupon the reactor is shut down, and wherein at least some of the chromium in the catalyst is at the reduced oxidation state.

In one embodiment, upon completion of this shut-down method, more than 50% of the chromium is in a reduced oxidation state. In a preferred embodiment, upon completion of the shut-down method, at least 75% of the chromium is in a reduced oxidation state. In a more preferred embodiment, upon completion of the shut-down method, at least 90% of the chromium is in a reduced oxidation state. In a most preferred embodiment, upon completion of the shut-down method, at least 99% of the chromium is in a reduced oxidation state.

A dehydrogenation reactor system generally includes a dehydrogenation reactor vessel having a reactor inlet for receiving hydrocarbon feedstock, air, and reducing gas, and two reactor outlets for discharging reactor effluents, one for discharging hydrocarbons and reducing gas and the other for discharging air. The dehydrogenation reactor vessel defines a dehydrogenation reaction zone and can contain dehydrogenation catalyst pellets that are usually mixed with inert alpha-alumina and packed together to form the dehydrogenation catalyst bed.

In operation, a dehydrogenation feed is introduced into the dehydrogenation reactor that is operated under dehydrogenation reaction conditions with the dehydrogenation catalyst at a first elevated temperature. During operation the dehydrogenation reactor is operated in the cyclic mode wherein the dehydrogenation part of the cycle is followed by a steam purge for a period of time sufficient to purge hydrocarbon from the catalyst surface. The catalyst is then regenerated by air followed by evacuation of the catalyst bed and then reduction of the catalyst by means of a reducing gas. All of the foregoing steps are conducted at a first elevated temperature. Once reduction is complete, a new dehydrogenation cycle can begin.

As is known in the art, the dehydrogenation reactor system may comprise several parallel reactors. Depending on the size and production rate of the system, typically three to ten reactors operate in cyclic mode, whereby simultaneously some reactors are operated in the intermediate steps of the cycle such as reduction, evacuation or steam purge, other reactors are operated in the dehydrogenation step of the cycle, while still other reactors are being regenerated.

In the operation of a hydrocarbon dehydrogenation reactor, the catalyst, such as Al—Cr, may last up to several years. As the catalytic performance decreases there is a need to unload the spent catalyst and replace it with new catalytic material. The shut-down of the reactor system typically requires a procedure for cooling down the spent catalyst prior to its removal.

In accordance with the present application, a method for shutting down a dehydrogenation reactor having a catalyst bed with a chromium-containing catalyst is illustrated in the FIG. 1, wherein in Stage 1 the reactor is operating at a first elevated temperature $T_1$, the method comprising the steps (a) cooling the catalyst bed with a first cooling gas to Stage 2 wherein the catalyst bed is at a second elevated temperature $T_2$, (b) removing the first cooling gas from the catalyst bed while maintaining the catalyst bed at about said second elevated temperature, (c) treating the catalyst bed with a reducing gas for a period of time sufficient to cause chemical reduction of at least some of the chromium in the catalyst to a reduced oxidation state, (d) cooling the catalyst bed with a second cooling gas from the second elevated temperature $T_2$ to Stage 3 wherein the catalyst bed is at a third elevated temperature $T_3$, (e) removing the reducing gas from the catalyst bed, (f) cooling the catalyst bed with a third cooling gas from the third elevated temperature $T_3$ to Stage 4 wherein the catalyst bed is at a fourth elevated temperature $T_4$, and (g) cooling the catalyst bed to the Final Stage wherein the catalyst bed is at ambient temperature $T_{amb}$, whereby the dehydrogenation reactor is shut down and the spent catalyst can be removed. Advantageously, at the conclusion of this shut-down method, at least some, and preferably a majority, of the chromium in the catalyst bed will be at a reduced oxidation state.

In one exemplary embodiment, in one or more of the cooling steps the rate of cooling is controlled such that the rate of change of the temperature of the catalyst in the bed is no more than about 50° C. per hour, preferably no more than about 20° C. per hour, and more preferably no more than about 10° C. per hour. In a preferred embodiment, in each of the cooling steps the rate of change of the temperature of the catalyst in the bed is no more than about 50° C. per hour, preferably no more than about 20° C. per hour, and more preferably no more than about 10° C. per hour.

In one exemplary embodiment, when the catalyst bed is at Stage 1 and prior to the first cooling of the catalyst bed to the second elevated temperature $T_2$, the introduction of the dehydrogenation feed into dehydrogenation reactor at the first elevated temperature $T_1$ is terminated and the catalyst at the first elevated temperature $T_1$ is subjected to a standard dehydrogenation-regeneration operating procedure such as described above. Upon completion of the dehydrogenation-regeneration process, the dehydrogenation catalyst is at a first elevated temperature $T_1$ that approximates the reactor temperature conditions existing immediately prior to the dehydrogenation feed termination and last regeneration, and a substantial proportion of the chromium in the catalyst is at a reduced oxidation state.

The first elevated temperature $T_1$ of the dehydrogenation catalyst bed can range from 500° C. to about 800° C., preferably from 525° C. to 750° C., and most preferably from 550° C. to 700° C.

In accordance with the present application, the dehydrogenation catalyst at the first elevated temperature $T_1$ is cooled with a first cooling gas to Stage 2 characterized by a second elevated temperature $T_2$. The second elevated temperature $T_2$ is less than the first elevated temperature $T_1$ of the dehydrogenation catalyst bed as described above, and can be in the range of from about 300° C. to just below the first elevated temperature, preferably from about 325° C. to about 500° C., and most preferably from about 350° C. to about 450° C.

Cooling of the catalyst bed from the first elevated temperature $T_1$ to the second elevated temperature $T_2$ can be accomplished by introducing a first cooling gas at a desired temperature through the inlet. In one embodiment, the first cooling gas is air which passes through air heaters before entering the reaction zone through the inlet. The pressure of the first cooling gas in the dehydrogenation reactor can range from below atmospheric pressure to 40 psia or greater. The temperature of the air heaters can be gradually reduced at a predetermined rate, such that the rate of change of the temperature of the catalyst in the bed is no more than about 50° C. per hour, preferably no more than about 20° C. per hour, and more preferably no more than about 10° C. per hour. The slow rate of change results in a gradual cooling down of the dehydrogenation catalyst bed inside of the reactor while avoiding thermo-shocks of the dehydrogenation reactor and air pre-heater. This cooling continues until the catalyst bed achieves the desired second elevated temperature as described above, as gauged by the temperature of the cooling gas at the reactor outlet. In some embodiments of the present application, and depending on the scale of the reactor, this first cool down step can take from several hours to several days. Once the desired second elevated temperature $T_2$ is reached, the flow of the first cooling gas is terminated.

After the flow of the first cooling gas has been terminated and Stage 2 has been reached, a substantial portion of the residual first cooling gas is removed from the reactor. This removal can be achieved by different methods. In one embodiment, the first cooling gas is removed by evacuation, with an evacuation pressure of 0.5 atmospheres or less being preferred. In another embodiment, the first cooling gas is removed from the reactor by purging with a non-air purging medium for a period of time, which can last from about ten seconds up to a few minutes, sufficient to eliminate the first cooling gas. Preferably, the removal of the first cooling gas is sufficient to remove traces of the first cooling gas from the catalyst pores and from any voids in the dehydrogenation reactor. The temperature of the purging medium is maintained in the range of the second elevated temperature $T_2$ to maintain the catalyst bed at the second elevated temperature during the purging. The choice of purging media can depend on factors such as the availability of such media at each reactor site and the compatibility of such media with the reactor and catalyst. Steam and nitrogen are each acceptable purging media typically used in dehydrogenation facilities, and therefore likely to be readily available. Upon completion of the purge, the introduction of the purging medium is terminated.

Following the first purge, the catalyst bed is treated with a reducing gas for a period of time sufficient to cause reduction of at least some of the chromium in the catalyst bed from a higher oxidation state to a lower oxidation state. At the beginning of this treatment, the catalyst bed is at the second elevated temperature $T_2$, which is a temperature high enough to allow the reaction of the reducing gas with the chromium in the catalyst to take place. The choice of the reducing gas will depend on the availability of the gas at the reactor site and compatibility of the reducing gas with the reactor and the catalyst. Suitable reducing gases include, without limitation, dehydrogenation hydrocarbons, such as isobutane, propane, n-butane, propylene, natural gas, hydrogen mixed with $C_1$-$C_4$ hydrocarbon, carbon monoxide; and mixtures of any of the foregoing. The treatment of the catalyst bed with the reducing gas continues until the desired level of reduction of the chromium in the catalyst bed has been achieved.

In one exemplary embodiment, the reducing gas has a heat capacity that allows it to also serve as a second cooling gas such that during the reducing gas treatment, the temperature in the catalyst bed can be lowered from the second elevated temperature $T_2$ of Stage 2 to a third elevated temperature $T_3$ of Stage 3. If the reducing gas does not have the heat capacity to cool the catalyst bed, then a separate second cooling gas is used to bring the catalyst bed from the second elevated temperature $T_2$ of Stage 2 to a third elevated temperature $T_3$ of Stage 3. In one embodiment, the third elevated temperature $T_3$ is in the range of about 155° C.-320° C. In a preferred embodiment, the third elevated temperature $T_3$ is in the range of about 230° C.-320° C. In a more preferred embodiment, the third elevated temperature $T_3$ is in the range of about 280° C.-320° C.

Once the reduction of the chromium has reached a desired level of completeness and the third elevated temperature $T_3$ of the catalyst bed is reached as measured by the outflow of the reactor gas, then introduction of the reducing gas is terminated. If the reducing gas does not serve as the second cooling gas, introduction of the reducing gas will be terminated when the reduction of the chromium has reached a desired level of completeness, and then a separate second cooling gas will be introduced until the third elevated temperature $T_3$ of the catalyst bed is reached as measured by the outflow of the reactor gas.

If the reducing gas does not serve as the second cooling gas, then the second cooling gas may be selected from $N_2$, $CO_2$, or propylene or isobutylene, each of which may be advantageously stored on site in the liquid state and converted into the gas state upon introduction into the reactor.

Next, the reducing gas is purged from the reactor. If the second cooling gas is different from the reducing gas, then the second cooling gas may serve as the purge medium. If the reducing gas and the second cooling gas are the same gas, then a different purge medium may be used to remove the reducing gas. The purging medium is preferably chemically inert and can again be steam, nitrogen, or other suitable non-reactive media, depending on the availability of such media at each reactor site and the compatibility of the media with the catalyst. The purging medium for the reducing gas purging step may also advantageously serve as a third cooling gas to cool the catalyst from the third elevated temperature $T_3$ of Stage 3 to a fourth elevated temperature $T_4$ at Stage 4 that is lower than the third elevated temperature, preferably in the range of about 50° C.-150° C. The time required for this purge and cooling will depend on the magnitude of the difference between the third and fourth elevated temperatures. When the desired fourth elevated temperature $T_4$ is reached, as indicated by the temperature of the effluent gas, the flow of the purge medium/third cooling gas is terminated. The fourth elevated temperature $T_4$ is low enough so that any oxygen that is thereafter introduced into the reactor will not react with the catalyst to re-oxidize the reduced chromium in the catalyst back to a higher oxidation state.

After the reducing gas has been removed and the catalyst bed has been cooled to the fourth elevated temperature $T_4$, the catalyst bed is cooled to the Final Stage of ambient temperature $T_{amb}$, or any temperature that permits the safe removal of the catalyst from the reactor. This cooling can be accomplished by a fourth cooling medium, which can be air or any other suitable cooling medium.

The dehydrogenation catalyst of the dehydrogenation reactor system operated in accordance with the method of the present application can be any known alumina-chromium catalyst that can be used in the dehydrogenation of hydrocarbons. Such dehydrogenation catalysts include those catalysts that comprise chromium and aluminum oxides. The chromium oxide of the dehydrogenation catalyst may be in any form and obtained from any source or by any method that provides a suitable chromium oxide material for use in the chromium aluminum catalyst. The aluminum oxide of the dehydrogenation catalyst may be in any form and obtained from any source or by any method that provides a suitable aluminum oxide material for use in the chromium aluminum catalyst including aluminum oxide that can be represented by gamma, theta, eta, kappa and alpha-alumina phase.

Typical alumina-chromium catalysts comprise from 10 to 40% of chromium oxide calculated as $Cr_2O_3$, and 55-90% of aluminum oxide calculated as $Al_2O_3$. Moreover, typical Al—Cr catalyst comprises from 0.3-5% of alkali or alkali-earth metals selected from the group consisting of Na, Li, K, Cs, Mg, Sr, Ca, Ba and combinations thereof. The alumina-chromium dehydrogenation catalyst may further comprise one or more promoters that are usually in form of oxides. These promoter metals may be selected from the group consisting of Sc, La, Mo, W, Zr, Sn, Mn, Cu, and mixtures thereof.

Temperatures at various stages of the method of the present application are expressed herein as temperatures of the catalyst bed. Those skilled in the art will recognize, however, that in commercial dehydrogenation processes carried out in adiabatic reactors, the temperature across the dehydrogenation catalyst bed can vary between the top part of the bed and the bottom part of the bed by as much as 150° C., but more typically from 10 to 120° C. As used herein, the temperature of the catalyst is indicated by the temperature of the effluent gas, whether it is a cooling medium, reducing gas, or other effluent.

EXAMPLE

In a test scale reactor, 30 g of CATOFIN STD catalyst was heated to 600° C. in air. The catalyst was cooled with air flow at atmospheric pressure to a temperature of 350° C. The air was evacuated to 0.5 atm. The catalyst was treated with propane gas for 30 minutes, which was then purged from the reactor by low pressure steam to cool the catalyst to 150° C. The reactor was purged with $N_2$ for 5 minutes, then cooled in air to ambient temperature. Four catalyst samples were identically treated. At the end of the treatment, it was determined that more than 99% of the chromium in the catalyst was in a reduced oxidation state.

Reasonable variations, modifications and adaptations can be made within the scope of the described disclosure and appended claims without departing from the scope of the invention.

What is claimed is:

1. A method of shutting down a dehydrogenation reactor, the dehydrogenation reactor housing a catalyst bed containing a chromium-oxide-containing catalyst, the catalyst bed operating at a first elevated temperature under dehydrogenation conditions, the method comprising:
   (a) cooling the catalyst bed with a first cooling gas from the first elevated temperature to a second elevated temperature lower than the first elevated temperature;
   (b) removing the first cooling gas from the catalyst bed while maintaining the catalyst bed at about said second elevated temperature;
   (c) treating the catalyst bed with a reducing gas for a period of time sufficient to cause chemical reduction of at least some of the chromium in the chromium-oxide-containing catalyst to a reduced oxidation state to provide a reduced catalyst;
   (d) cooling the catalyst bed with a second cooling gas from the second elevated temperature to a third elevated temperature lower than the second elevated temperature;
   (e) removing the reducing gas from the catalyst bed;
   (f) cooling the catalyst bed with a third cooling gas from the third elevated temperature to a fourth elevated temperature lower than the third elevated temperature; and
   (g) cooling the catalyst bed with a fourth cooling gas from the fourth elevated temperature to ambient temperature, whereupon the dehydrogenation reactor is shut down.

2. The method of claim 1, wherein the rate of cooling of the catalyst bed from the first elevated temperature to the second elevated temperature is no greater than about 50° C. per hour.

3. The method of claim 1, wherein the first cooling gas is heated air.

4. The method of claim 1, wherein the first elevated temperature is in the range of about 500° C. to about 800° C.

5. The method of claim 4, wherein the first elevated temperature is in the range of about 525° C. to about 750° C.

6. The method of claim 5, wherein the first elevated temperature is in the range of about 550° C. to about 700° C.

7. The method of claim 1, wherein the removal of the first cooling gas is accomplished by evacuation of the dehydrogenation reactor to a pressure of about 0.5 atm or less.

8. The method of claim 1, wherein the removal of the first cooling gas is accomplished by purging with a purging gas.

9. The method of claim 8, wherein the purging gas is selected from steam, nitrogen, and mixtures thereof.

10. The method of claim 1, wherein the second elevated temperature is in the range of greater than 300° C. and less than the first elevated temperature.

11. The method of claim 10, wherein the second elevated temperature is in the range of about 325° C. to about 500° C.

12. The method of claim 11, wherein the second elevated temperature is in the range of about 350° C. to about 450° C.

13. The method of claim 1, wherein the reducing gas comprises a gas selected from isobutene, propane, n-butane, propylene, natural gas, hydrogen mixed with $C_1$-$C_4$ hydrocarbons, carbon monoxide, and mixtures of any of the foregoing.

14. The method of claim 1, wherein the reducing gas also serves as the second cooling gas to reduce the temperature of the catalyst bed from the second elevated temperature to the third elevated temperature.

15. The method of claim 14, wherein removing the reducing gas from the catalyst bed comprises purging the reducing gas from the catalyst bed using the third cooling gas.

16. The method of claim 1, wherein the second cooling gas is different from the reducing gas.

17. The method of claim 16, wherein the second cooling gas is introduced after the catalyst bed is at the reduced oxidation state, and wherein removing the reducing gas from the catalyst bed comprises purging the reducing gas from the catalyst bed using the second cooling gas.

18. The method of claim 1, wherein the third cooling gas is chemically inert.

19. The method of claim 18, wherein the third cooling gas is selected from steam and nitrogen.

20. The method of claim 1, wherein the third elevated temperature is in the range of about 155° C. to less than about 320° C.

21. The method of claim 20, wherein the third elevated temperature is in the range of about 230° C. to about 320° C.

22. The method of claim 21, wherein the third elevated temperature is in the range of about 280° C. to about 320° C.

23. The method of claim 1, wherein the fourth elevated temperature is in the range of about 50° C. to less than the third elevated temperature.

24. The method of claim 23, wherein the fourth elevated temperature is in the range of about 100° C. to less than the third elevated temperature.

25. The method of claim 24, wherein the fourth elevated temperature is in the range of about 150° C. to less than the third elevated temperature.

26. The method of claim 1, wherein the fourth cooling gas is air.

27. The method of claim 1, wherein the fourth elevated temperature of the reactor is sufficiently low such that, when the air is introduced into the reactor, the chromium in the reduced catalyst is not oxidized.

28. The method of claim 1, wherein upon completion of the method at least 90% of the chromium of the reduced catalyst is in a reduced oxidation state.

29. The method of claim 28, further comprising removing the reduced catalyst from the dehydrogenation reactor after the reactor is shut down.

30. The method of claim 1, further comprising removing the reduced catalyst from the dehydrogenation reactor after the reactor is shut down and replacing the reduced catalyst with a different chromium-oxide-containing catalyst.

\* \* \* \* \*